US010923733B2

(12) United States Patent
Yoon et al.

(10) Patent No.: US 10,923,733 B2
(45) Date of Patent: Feb. 16, 2021

(54) NANOCATALYST SUITABLE FOR AN ANODE OF A SOLID OXIDE FUEL CELL

(71) Applicants: KOREA INSTITUTE OF SCIENCE AND TECHNOLOGY, Seoul (KR); INDUSTRY-UNIVERSITY COOPERATION FOUNDATION HANYANG UNIVERSITY, Seoul (KR)

(72) Inventors: Kyung Joong Yoon, Seoul (KR); Yun Jung Lee, Seoul (KR); Ji-su Shin, Seoul (KR); Mansoo Park, Seoul (KR); Ho Il Ji, Seoul (KR); Hyoungchul Kim, Seoul (KR); Ji-Won Son, Seoul (KR); Jong Ho Lee, Seoul (KR); Byung Kook Kim, Seoul (KR); Hae-Weon Lee, Seoul (KR)

(73) Assignees: Korea Institute of Science and Technology, Seoul (KR); Industry-University Cooperation Foundation Hanyang University, Seoul (KR)

(*) Notice: Subject to any disclaimer, the term of this patent is extended or adjusted under 35 U.S.C. 154(b) by 77 days.

(21) Appl. No.: 16/256,905

(22) Filed: Jan. 24, 2019

(65) Prior Publication Data

US 2019/0296366 A1 Sep. 26, 2019

(30) Foreign Application Priority Data

Mar. 26, 2018 (KR) .................. 10-2018-0034503

(51) Int. Cl.
*H01M 4/00* (2006.01)
*H01M 4/90* (2006.01)
(Continued)

(52) U.S. Cl.
CPC ....... *H01M 4/9033* (2013.01); *H01M 4/8605* (2013.01); *H01M 8/1246* (2013.01); *H01M 2008/1293* (2013.01)

(58) Field of Classification Search
CPC ............ H01M 8/1246; H01M 8/1253; H01M 4/8605; H01M 4/9033; H01M 4/9058
See application file for complete search history.

(56) References Cited

U.S. PATENT DOCUMENTS

2013/0189607 A1* 7/2013 Sakai .................... B01J 35/004
                                                        429/524
2016/0107143 A1* 4/2016 Schammel ............... C07C 2/78
                                                        585/500

FOREIGN PATENT DOCUMENTS

KR        10-1162629 B1     7/2012
KR    10-2012-0026041 A     1/2018

OTHER PUBLICATIONS

A. Mohammed Hussain et al., "Effective improvement of interface modified strontium titanate based solide oxide fuel cell anodes by infiltration with nano-sized palladium and gadolinium-doped cerium oxide", Electrochimica Acta, 2013, pp. 635-643, vol. 113.
(Continued)

*Primary Examiner* — Cynthia H Kelly
*Assistant Examiner* — Monique M Wills
(74) *Attorney, Agent, or Firm* — Rabin & Berdo, P.C.

(57) ABSTRACT

The present disclosure relates to a nanocatalyst for an anode of a solid oxide fuel cell and a method for preparing the same. More particularly, the present disclosure relates to a nanocatalyst for an anode of a solid oxide fuel cell obtained by forming a ceramic nanocatalyst including a noble metal dispersed therein in an atomic unit and contained in an ionic state having an oxidation number other than 0 through an in situ infiltration process in the internal pores of a porous electrode, and to application of the nanocatalyst to a solid
(Continued)

oxide fuel cell having significantly higher electrochemical characteristics as compared to the solid oxide fuel cells including the conventional nickel-based anode and oxide anode, and particularly showing excellent characteristics at an intermediate or low temperature of 600° C. or less.

5 Claims, 17 Drawing Sheets

(51) Int. Cl.
      *H01M 8/1246*     (2016.01)
      *H01M 4/86*       (2006.01)
      *H01M 8/124*      (2016.01)

(56) References Cited

OTHER PUBLICATIONS

Wenyuan Li et al., "Effect of adding urea on performance of $Cu/CeO_2$/yttria-stabilized zirconia anodes for solid oxide fuel cells prepared by impregnation method", Electrochimica Acta, 2011, pp. 2230-2236, vol. 56.

\* cited by examiner

NANOCATALYST SUITABLE FOR AN ANODE OF A SOLID OXIDE FUEL CELL

CROSS-REFERENCE TO RELATED APPLICATIONS

This application claims priority under 35 U.S.C. § 119 to Korean Patent Application No. 10-2018-0034503 filed on Mar. 26, 2018 in the Korean Intellectual Property Office, the disclosure of which is incorporated herein by reference in its entirety.

TECHNICAL FIELD

The following disclosure relates to a nanocatalyst for an anode of a solid oxide fuel cell and a method for preparing the same. More particularly, the following disclosure relates to a nanocatalyst for an anode of a solid oxide fuel cell obtained by forming a ceramic nanocatalyst including a noble metal dispersed therein in an atomic unit and contained in an ionic state having an oxidation number other than 0 through an in situ infiltration process in the internal pores of a porous electrode, and to application of the nanocatalyst to a solid oxide fuel cell having significantly higher electrochemical characteristics compared to the solid oxide fuel cells including the conventional nickel-based anode and oxide anode, and particularly showing excellent characteristics at an intermediate or low temperature of 600° C. or less.

BACKGROUND

A solid oxide fuel cell (SOFC) has been given many attentions as next generation energy technology for large-scale power generation and distributed generation due to its high efficiency, high-quality heat, fuel flexibility, a degree of freedom in capacity designing, or the like. However, commercialization of solid oxide fuel cells is limited due to the degradation of various constitutional elements thereof exposed to high temperature. Particularly, degradation of a nickel-based anode has been regarded as a serious problem. The main causes of degradation of a nickel-based anode include agglomeration of nickel particles, carbon deposition, sulfur poisoning and thermal stress generated by redox cycles. Nickel in an anode, which is the only metallic component among the constitutional elements of the conventional cell, has a lower melting point than the other ceramic materials, and thus undergoes rapid agglomeration under a high-temperature operating condition. This causes a decrease in active sites where electrode surface reactions occur, thereby inducing an increase in electrode resistance. In addition, when using a hydrocarbon-based fuel, carbon is deposited on the nickel surface to interrupt electrochemical reactions and gas flow. When such interruption occurs severely, stress may be generated to cause a rupture of the structure. Further, when the fuel includes a small amount of sulfur, it may be adsorbed to the nickel surface to interrupt electrochemical reactions. When sulfur is present at a high concentration, nickel-sulfur compounds may be formed. Finally, when a problem occurs in fuel supply or sealing during the operation of a cell, oxygen partial pressure in the anode is increased to cause oxidation of nickel, which causes a rapid change in volume and mechanical rupture. The fundamental cause of such degradation phenomena is the metallic nature of nickel. Thus, when nickel is substituted with an oxide material, most problems may be solved at the same time. In other words, since an oxide-based anode has a higher melting point as compared to nickel, it shows a significantly low tendency of high-temperature agglomeration, has high resistance against sulfur poisoning and carbon deposition and shows little change in volume during redox cycles. Therefore, some studies have been conducted for a long time to develop an oxide anode capable of substituting for nickel. However, it was not possible to overcome a difference in performance as compared to nickel actually. Thus, such studies could not get over the level of laboratorial studies. In other words, since the catalytic characteristics of nickel for fuel oxidation is significantly higher than those of an oxide anode. Thus, when using an oxide anode, the performance of a cell is significantly lower. Therefore, it is required to improve the catalytic characteristics of an oxide anode for its practical applications.

One method for improving the catalytic characteristics of an oxide anode is introducing a nanocatalyst through an infiltration process. When using an infiltration process, a high-temperature heat treatment step is not required, and thus any issue about thermal and chemical compatibility may be avoided. Thus, it is possible to use various materials as catalysts. In addition, since the amount of raw materials consumed for forming nanoparticles is low, there is no significant limitation in use of expensive materials, including noble metals, in terms of cost efficiency. To apply an infiltration process to an oxide anode efficiently, two requirements should be satisfied.

First, it is required that a solution containing precursors of a nanocatalyst dissolved therein is introduced to a porous electrode so that nanoparticles may be formed in situ in the internal pores of the electrode. The pores of an electrode are significantly small in a sub-micron scale and entangled complicatedly. Thus, it is difficult to infiltrate a nanocatalyst synthesized preliminarily in the external environment into the electrode and attach the nanocatalyst uniformly to the surface. Second, it is required to prevent agglomeration of nanoparticles at high temperature. Nanoparticles have a large specific surface area and highly tend to agglomerate at high temperature. Thus, when a nanomaterial is used for an SOFC, it shows high performance at the initial stage of operation but undergoes deterioration rapidly with the lapse of time. Therefore, when a nanocatalyst having excellent high-temperature stability is prepared in-situ in an electrode to improve the surface reaction rate of an oxide anode to the same level as nickel and to inhibit deterioration of performance caused by agglomeration, it is possible to apply the oxide anode having excellent durability to a cell actually.

As a result, the inventors of the present disclosure have found that a nanocatalyst formed in situ in the internal pores of a porous electrode through an infiltration process can be applied to a solid oxide fuel cell having significantly higher electrochemical characteristics as compared to the solid oxide fuel cells including the conventional nickel-based anode and oxide anode, and particularly showing excellent characteristics at an intermediate or low temperature of 600° C. or less. The present disclosure is based on this finding.

REFERENCES

Patent Document 1. Korean Patent Publication No. 10-1162629

Patent Document 2. Korean Patent Laid-Open No. 10-2012-0026041

SUMMARY

The present disclosure is designed to solve the problems of the related art, and an embodiment of the present disclosure is directed to providing a nanocatalyst for an anode of a solid oxide fuel cell formed through an in situ infiltration process in the internal pores of a porous electrode, and to application of the nanocatalyst to a solid oxide fuel cell having significantly higher electrochemical characteristics as compared to the solid oxide fuel cells including the conventional nickel-based anode and oxide anode, and particularly showing excellent characteristics at an intermediate or low temperature of 600° C. or less.

In one aspect of the present disclosure, there is provided a nanocatalyst for an anode of a solid oxide fuel cell formed in the internal pores of a porous electrode, wherein the nanocatalyst is doped with a plurality of metal particles dispersed on a ceramic surface, the metal is at least one selected from Pt, Au, Ag, Pd, Ir, Rh, Ru, Pd and Os, and the ceramic is fluorite represented by the following Chemical Formula 1:

$$A_{1-a-b}Ce_aZr_bO_{2-\delta}$$ [Chemical Formula 1]

wherein A is at least one selected from Y, Sc, Gd, Sm, La, Nb, Nd, Pr, Yb, Er, Tb and Ca, and each of a, b and δ is a real number satisfying $0 \leq a \leq 1$, $0 \leq b \leq 1$ and $0 \leq \delta \leq 1$.

In another aspect of the present disclosure, there is provided a method for preparing a nanocatalyst for an anode of a solid oxide fuel cell, the method including the steps of: (a) carrying out infiltration of a solution containing a catalyst precursor, solvent and a precipitating agent or complexing agent to a porous electrode; and (b) heat treating the porous electrode.

According to the present disclosure, it is possible to form a nanocatalyst for an anode of a solid oxide fuel cell through an in situ infiltration process in the internal pores of a porous electrode, and to apply the nanocatalyst to a solid oxide fuel cell having significantly higher electrochemical characteristics as compared to the solid oxide fuel cells including the conventional nickel-based anode and oxide anode, and particularly showing excellent characteristics at an intermediate or low temperature of 600° C. or less.

BRIEF DESCRIPTION OF THE DRAWINGS

[FIG. 8A: 800° C., FIG. 8B: 700° C. and FIG. 8C: 600° C.].

DETAILED DESCRIPTION OF EMBODIMENTS

Figure 1:
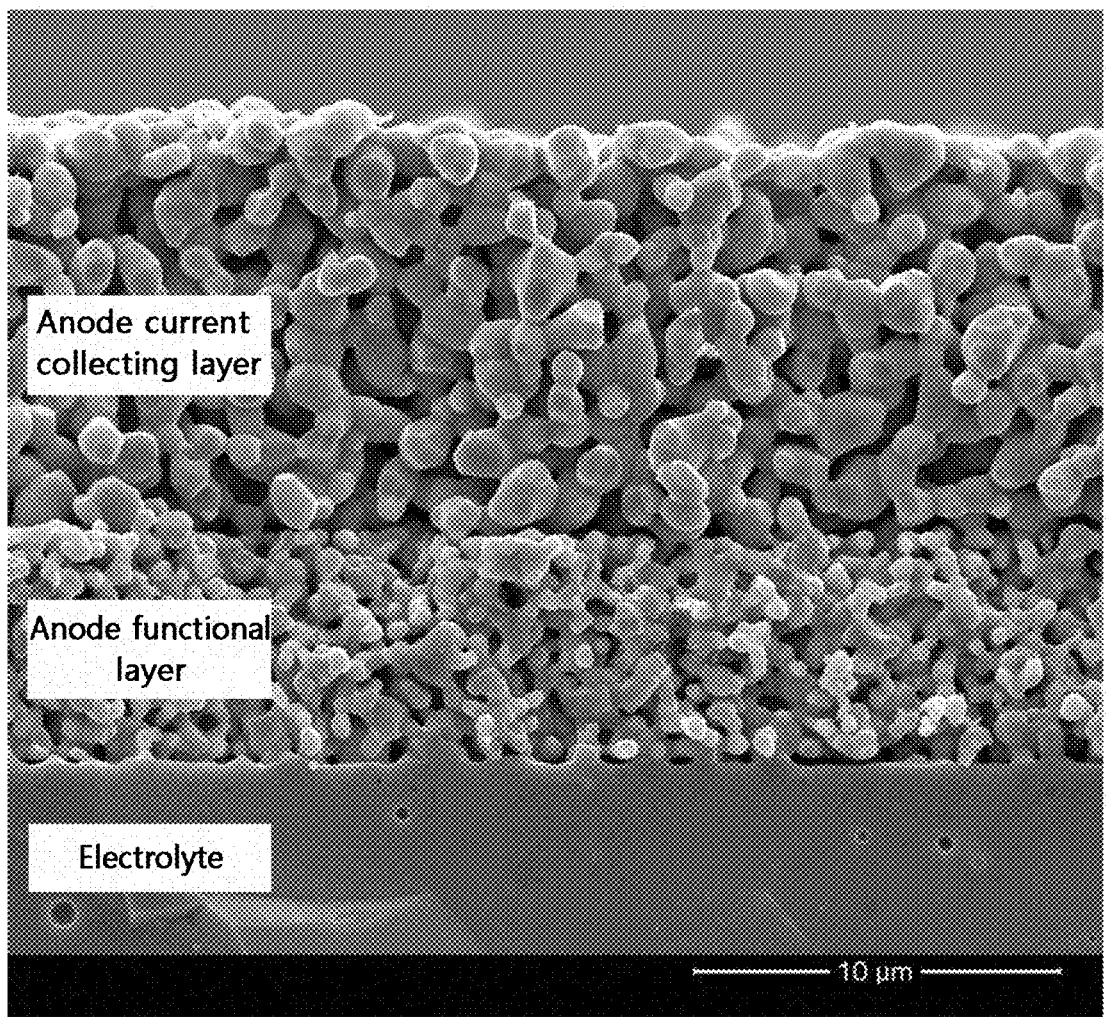
FIG. 1 shows a scanning electron microscopic (SEM) image of the porous oxide anode obtained from Preparation example 1.

Hereinafter, various aspects and embodiments of the present disclosure will be explained in more detail.

In one aspect of the present, there is provided a nanocatalyst for an anode of a solid oxide fuel cell formed in the internal pores of a porous electrode, wherein the nanocatalyst is doped with a plurality of metal particles dispersed on a ceramic surface, the metal is at least one selected from Pt, Au, Ag, Pd, Ir, Rh, Ru, Pd and Os, and the ceramic is fluorite represented by the following Chemical Formula 1:

$$A_{1-a-b}Ce_aZr_bO_{2-\delta}$$ [Chemical Formula 1]

wherein A is at least one selected from Y, Sc, Gd, Sm, La, Nb, Nd, Pr, Yb, Er, Tb and Ca, and each of a, b and δ is a real number satisfying $0 \leq a \leq 1$, $0 \leq b \leq 1$ and $0 \leq \delta \leq 1$.

According to the related art, Ni having excellent catalytic characteristics in fuel oxidation has been used widely as an anode of a solid oxide fuel cell (SOFC). Since Ni has excellent characteristics but shows several problems in terms of stability as compared to the other materials, it is required to prepare a counter measure for those problems in order to commercialize SOFC. Most of the problems of Ni related with stability result from the metallic nature of Ni. Thus, when Ni is replace by an oxide anode, all of the problems can be solved. Therefore, some studies have been conducted for a long time to develop an oxide anode capable of replacing Ni and the high stability of such an oxide anode has been demonstrated. However, since the oxide anode has significantly lower catalytic performance as compared to Ni, it has not been applied to actual cells. To apply a highly durable oxide anode, it is required to improve the catalytic characteristics of the oxide catalyst to a level similar to those of Ni.

According to the present disclosure, an infiltration process is used to coat the internal pores of an oxide electrode in-situ with ceramic nanoparticles doped with metal. Thus, it is possible to obtain higher characteristics as compared to the conventional Ni-based anode. In addition, since the metal is doped in an ionic form, it can be seen that no agglomeration occurs at high temperature to provide excellent thermal stability. This results in improvement of the performance of a highly durable oxide electrode to a significantly higher level as compared to Ni. Therefore, it is possible to replace Ni with the oxide electrode. It is thought that the oxide electrode obtained by the above-mentioned technology can solve most of the problems related with deterioration of performance occurring at an anode of SOFC. In addition, the oxide anode to which the nanocatalyst for an anode of a solid oxide fuel cell according to the present disclosure is infiltrated particularly shows excellent performance at low temperature. Thus, it is thought that the oxide anode may contribute to a decrease in operation temperature of SOFC.

According to an embodiment of the present disclosure, the metal may be present in an amount of 0.5-20 mol %, preferably 1-10 mol %, and more preferably 2-6 mol % based on the nanocatalyst.

When the metal content is less than 2 mol %, the catalytic activity may be insufficient. When the metal content is larger than 6 mol %, there is a problem in that metal particles may be agglomerated during electrochemical reactions.

According to another embodiment, the nanocatalyst may have a size of 1-100 nm, preferably 10-60 nm, and more preferably 30-40 nm. The metal particles may have a size of 0.1-10 nm, preferably 0.1-5 nm, and more preferably 0.1-1 nm.

When the size of the nanocatalyst is not within a range of 30-40 nm, or the size of the metal particles is not within 0.1-1 nm, polarization resistance is increased at an intermediate or low temperature of 600° C. or less, resulting in the loss of the catalytic activity.

According to another embodiment of the present disclosure, the metal particles may be present in an ionic form or in a mixed form of ions with metal.

According to still another embodiment, the metal particles may be present in a mixed form of ions with metal, and the ratio of the metal particles present in an ionic form may be 30-100 wt % based on the total weight of the metallic component, as determined by X-ray photoelectron spectroscopy (XPS).

Particularly, when the ratio of the metal particles present in an ionic form is within the above-defined range, no agglomeration occurs at a high temperature of 800° C. or higher, thereby providing excellent thermal stability. On the contrary, when the ratio is not within the above-defined range, agglomeration occurs significantly at a high temperature of 800° C. or higher.

Particularly, although there is no clear description in the following Examples or Comparative Examples, the ratio of metal based on the nanocatalyst, size of the nanocatalyst, size of the metal particles and the ratio of metal particles present in an ionic form were varied in the nanocatalyst for an anode of a solid oxide fuel cell according to the present disclosure, each of the anodes including the obtained nanocatalysts for an anode of a solid oxide fuel cell was applied to a solid oxide fuel cell, and then a performance loss of the nanocatalyst applied to the anode was determined after each solid oxide fuel cell is operated at high temperature for 500 hours.

As a result, unlike the other conditions and the other numerical ranges, when all of the following conditions are satisfied, no performance loss of the catalyst applied to the anode can be observed even after the solid oxide fuel cell is operated at high temperature for 500 hours:

(1) the nanocatalyst includes the metal in an amount of 2-6 mol %;

(2) the nanocatalyst has a size of 30-40 nm;

(3) the metal particles have a size of 0.1-1 nm;

(4) the metal particles are present in an mixed form of ions with metal; and (5) the ratio of the metal particles present in an ionic form is 30-100 wt % based on the total weight of the nanocatalyst, as determined by XPS analysis.

However, when any one of the above conditions is not satisfied, a significant loss of the catalyst applied to the anode is observed after the solid oxide fuel cell is operated at high temperature for 500 hours.

In another aspect of the present disclosure, there is provided a method for preparing a nanocatalyst for an anode of a solid oxide fuel cell, the method including the steps of: (a) carrying out infiltration of a solution containing a catalyst precursor, solvent and a precipitating agent or complexing agent to a porous electrode; and (b) heat treating the porous electrode.

According to an embodiment of the present disclosure, the catalyst may be a mixture of metal and ceramic.

According to another embodiment of the present disclosure, the metal may be at least one selected from Pt, Au, Ag, Pd, Ir, Rh, Ru, Pd and Os, but is not limited thereto. Preferably, the metal may be Pt.

The precursor of metal may be at least one selected from metal nanopowder, chloride, bromide, iodide, nitrate, nitrite, sulfate, acetate, sulfite, acetylacetonate and hydroxide, but is not limited thereto. Preferably, the precursor of metal may be a metal chloride.

According to still another embodiment of the present disclosure, the ceramic may be fluorite represented by the following Chemical Formula 1:

$$A_{1-a-b}Ce_aZr_bO_{2-\delta}$$  [Chemical Formula 1]

wherein A is at least one selected from Y, Sc, Gd, Sm, La, Nb, Nd, Pr, Yb, Er, Tb and Ca, and each of a, b and δ is a real number satisfying 0≤a≤1, 0≤b≤1 and 0≤δ≤1.

Preferably, the fluorite may be $CeO_2$.

The precursor of ceramic may be ceramic nanopowder, chloride, bromide, iodide, nitrate, nitrite, sulfate, acetate, sulfite, acetylacetonate and hydroxide, but is not limited thereto. Preferably, the precursor of ceramic may be a ceramic nitrate.

According to still another embodiment of the present disclosure, the metal may be present in an amount of 0.5-20 mol %, preferably 1-10 mol %, and more preferably 2-6 mol %, based on the mixture.

According to still another embodiment of the present disclosure, the solvent may be a mixture containing water and alcohol at a volume ratio of 1:0-3, preferably 1:0.1-2, and more preferably 1:0.1-1, wherein the alcohol may be at least one selected from methanol, ethanol, propanol and butanol.

According to still another embodiment of the present disclosure, the precipitating agent or complexing agent may be at least one selected from urea, melamine, diethylene triamine (DETA), glycine, ethylenediamine tetraacetic acid (EDTA), nitrilotriacetic acid (NTA), diaminocyclohexane-N,N'-tetraacetic acid (DCTA), diethylene triamine pentaacetic acid (DTPA) and ethyleneglycol-bis-(2-aminoethylether) (EGTA), but is not limited thereto. Preferably, the precipitating agent or complexing agent may be urea. In addition, the precipitating agent or complexing agent may be used in an amount 3-15 times higher than the amount of cations in the solution.

According to still another embodiment of the present disclosure, the heat treatment may be carried out thorough:

(i) a first heat treatment step of heating from room temperature to a first heat treatment temperature of 60-100° C. at a rate of 1-10° C./min; (ii) a second heat treatment step of heating from the first heat treatment temperature to a second heat treatment temperature of 130-180° C. at a rate of 0.1-1° C./min; (iii) a third heat treatment step of heating from the second heat treatment step to a third heat treatment temperature of 280-320° C. at a rate of 1-10° C./min; (iv) a fourth heat treatment step of heating from the third heat treatment step to a fourth heat treatment temperature of 480-520° C. at a rate of 1-10° C./min; and (v) a fifth heat treatment step of heating from the fourth heat treatment temperature to a fifth heat treatment temperature of 600-700° C. at a rate of 1-10° C./min.

The method may further include a cooling step right after reaching the temperature of the fifth heat treatment step.

In general, when metal nanoparticles having a size of several tens of nanometers or less are exposed to high temperature, they may be agglomerated rapidly and the particle size may increase. However, according to the present disclosure, it is possible to improve the characteristics of the nanocatalyst by forming and retaining the metal nanoparticles in an ionic form.

It has been found that the following three requirements should be satisfied in order to form the metal nanoparticles in an ionic form and to retain their ionic form even after heat treatment. Particularly, the three requirements should be essentially satisfied. First, heat treatment should be carried out through the above-mentioned five steps at each of the above-defined heating rates. Second, cooling should be carried out right after the fifth heat treatment temperature is accomplished. Third, the final temperature in each of the first to the fifth heat treatment steps should be controlled as mentioned above. When any one of the above requirements is not satisfied, it is shown that the metal nanoparticles are not present in an ionic form.

Further, according to the present disclosure, it is shown that when the cooling step is carried out by natural cooling without heating instead of accelerated cooling using a cooling unit, agglomeration of metal particles is inhibited effectively after heat treatment.

Exemplary embodiments now will be described more fully hereinafter with reference to the accompanying drawings, in which exemplary embodiments are shown.

Preparation Example 1: Preparation of Porous Oxide Anode (1) Synthesis of Powder A porous oxide anode includes an upper layer (current collecting layer) and a lower layer (functional layer). The powder for the upper layer includes 100% of LSCM $((La_{0.75}Sr_{0.25})(Cr_{0.5}Mn_{0.5})O_3)$. According to the present disclosure, LSCM powder was synthesized using a glycine-nitrate process. The powder for the lower layer includes 50% of LSCM and 50% of yttria-doped zirconia (YSZ). The same LSCM powder as the upper layer and commercially available (Tosoh) YSZ powder were used. First, to prepare LSCM powder, $La(NO_3)_3$—$_6H_2O$, $Sr(COOCH_3)_2$, $Cr(NO_3)_3$, $Mn(COOCH_3)_2$ and glycine were introduced to distilled water and mixed using a magnetic stirrer to provide a mixed solution. The following Table 1 shows the composition of the solution. The mixed solution was introduced to a container heated to 400° C. or more to carry out firing. Then, the fired powder was collected, screened through a 100 μm sieve and calcined at 1100° C. for 2 hours. The calcined powder was milled for 24 hours through dry milling and collected by using a 100 μm sieve.

TABLE 1

| Ingredients | Amount (g) |
| --- | --- |
| Lanthanum nitrate hexahydrate | 23.066 |
| Strontium acetate | 3.653 |
| Chromium nitrate | 14.139 |
| Manganese acetate | 8.66 |
| Glycine | 10.002 |
| D.I water | 173.791 |

(2) Preparation of Paste

To an 80 mL nylon bowl, 3 wt % of KD6, zirconia balls, based on the weight of the powder were introduced and milled, while the powder was added thereto in a portion of 25% at an interval of 1 hour. The milling was carried out at 140 rpm using a planetary milling machine. After all powder was added and milled for 24 hours, a binder and a plasticizer were introduced and milling was further carried out at 220 rpm for 24 hours. The composition of each of the lower layer, upper layer and paste is shown in the following Tables 2 and 3.

TABLE 2

| Ingredients | Amount (g) |
| --- | --- |
| LSCM | 7.5 |
| YSZ | 6.92 |
| α-terpineol | 10.9 |
| KD6 | 0.47 |
| BH3 | 0.36 |
| DBP | 0.29 |

TABLE 3

| Ingredients | Amount (g) |
| --- | --- |
| LSCM | 12.2 |
| α-terpineol | 9.14 |
| KD6 | 0.34 |
| BH3 | 0.37 |
| DBP | 0.21 |

(3) Manufacture of Cell

The lower layer paste was applied to one surface of a commercially available YSZ cell electrolyte substrate through screen printing, and dried at 60° C. for 30 minutes and at 80° C. for 1 hour. Then, the upper layer paste was applied through screen printing and dried under the same condition as the lower layer. After completing the application on one surface, the lower layer and the upper layer were applied successively to the opposite surface in the same manner as described above. Then, sintering was carried out using an electric furnace according to the schedule as shown in the following Table 4.

TABLE 4

| Temperature | Heating time | Heating rate | Retention time |
| --- | --- | --- | --- |
| 170° C. | 1 h 40 sec | 1.5° C./min | 1 h |
| 350° C. | 2 h | 1.5° C./min | 2 h |
| 400° C. | 30 min | 2° C./min | 2 h |
| 600° C. | 2 h | 1.6° C./min | 1 h |
| 800° C. | 1 h | 3.3° C./min | 1 h |

TABLE 4-continued

| Temperature | Heating time | Heating rate | Retention time |
|---|---|---|---|
| 1000° C. | 1 h | 3.3° C./min | 1 h |
| 1250° C. | 1 h 10 min | 3.57° C./min | 2 h |
| 1000° C. | 1 h | 3.3° C./min | 0 |
| 20° C. | 4 h | | 0 |

Example 1: Formation of Pt (4 mol %)-$CeO_2$ Nanocatalyst

An infiltration solution including a noble metal, precursor of ceramic, solvent and a precipitating agent or complexing agent was used. Pt—$CeO_2$ was prepared according to the following method. First, $Ce(NO_3)_3$-$6H_2O$, $K_2PtCl_4$ and urea were introduced to distilled water and the solution was mixed using a magnetic stirrer for about 10 minutes. Then, alcohol was added thereto and the solution was further mixed using a magnetic stirred for 10 minutes. The infiltration solution had the composition as shown in the following Table 5. After that, 1.5 μL of the infiltration solution was dropped onto the surface of the porous oxide anode obtained from Preparation Example 1 using a pipette so that it might be infiltrated thereto. Then, an electric furnace was used to perform heat treatment according to the schedule as shown in the following Table 6. In this manner, a porous oxide anode including a Pt (4 mol %)-$CeO_2$ nanocatalyst formed thereon was obtained.

TABLE 5

| Ingredients | Amount (g) |
|---|---|
| Cerium nitrate hexahydrate | 0.868 |
| Potassium tetrachloro-palatinate | 0.0315 |
| urea | 1.247 |
| D.I water | 2.5 |
| Ethanol | 1.184 |

TABLE 6

| Temperature | Heating time | Heating rate | Retention time |
|---|---|---|---|
| 80° C. | 10 min | 8° C./min | 2 h |
| 150° C. | 2 h | 0.58° C./min | 1 h |
| 300° C. | 30 min | 5° C./min | 1 h |
| 500° C. | 40 min | 5° C./min | 2 h |
| 650° C. | 30 min | 5° C./min | 1 h |
| 20° C. | 2 h | | 0 |

Comparative Example 1: Formation of $CeO_2$ Nanocatalyst

A porous oxide anode including a $CeO_2$ nanocatalyst formed thereon was obtained in the same manner as Example 1, except that the infiltration solution includes no $K_2PtCl_4$.

Comparative Example 2: Ni-YSZ Anode

A conventionally used Ni-YSZ anode including commercially available YSZ cell electrolyte pellets coated with nickel was prepared.

FIG. 1 shows a scanning electron microscopic (SEM) image of the porous oxide anode obtained from Preparation example 1.

Referring to FIG. 1, the microstructure of a porous oxide anode formed on an 8 mol % yttria-doped zirconia (YSZ) electrolyte substrate is shown. The oxide anode includes an anode functional layer that is in contact with the electrolyte and the anode current collecting layer on the surface. In the anode functional layer, an electrochemical reaction by which fuel is oxidized occurs and the anode current collecting layer functions to distribute electric current and gas uniformly in the horizontal direction. The anode functional layer is a complex of an electron conductor, $(La_{0.6}Sr_{0.4})(Cr_{0.5}Mn_{0.5})O_3$ (LSCM), with an ion conductor, YSZ, wherein the two phases are present at a weight ratio of 1:1. Since the anode functional layer should provide sufficient sites for electrochemical reaction, it preferably has a high specific surface area and three-phase interface. Thus, the anode functional layer has a relatively fine microstructure. It is required to improve the surface characteristics of that portion in order to improve the surface reaction rate in the oxide anode. On the contrary, the anode current collecting layer includes a single phase of electron conductor, LSCM, and has a coarse structure for the purpose of smooth flow of electric current and gas.

Figure 2A:
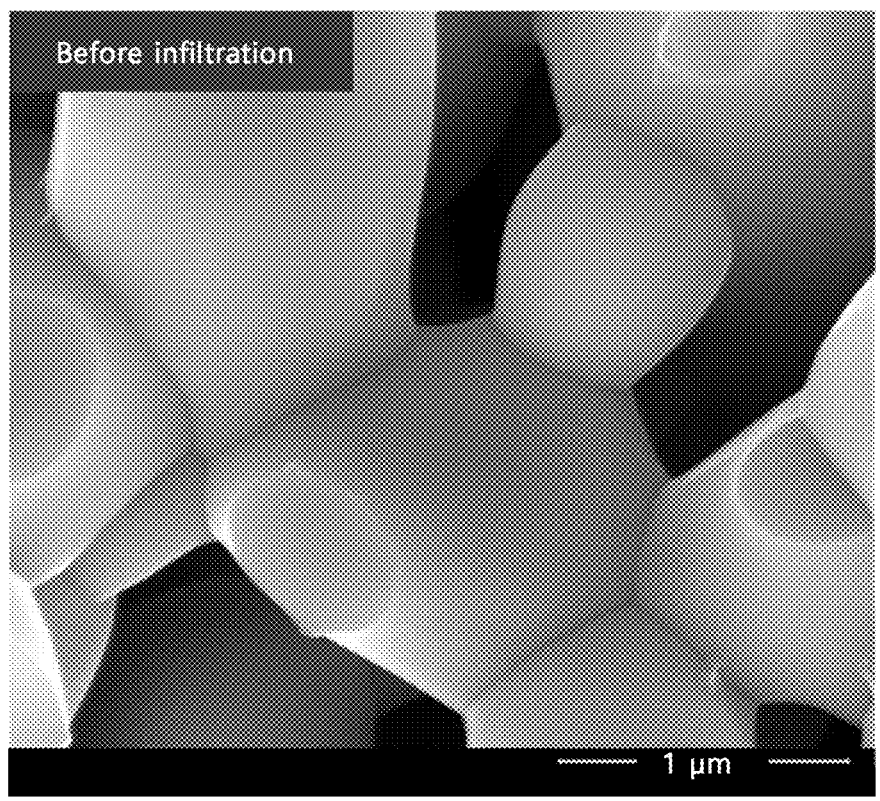
FIGS. 2A and 2B show SEM images of the surface of the porous oxide anode functional layer according to Example 1, specifically before infiltration in FIG. 2A and after infiltration in FIG. 2B.
Figure 2B:
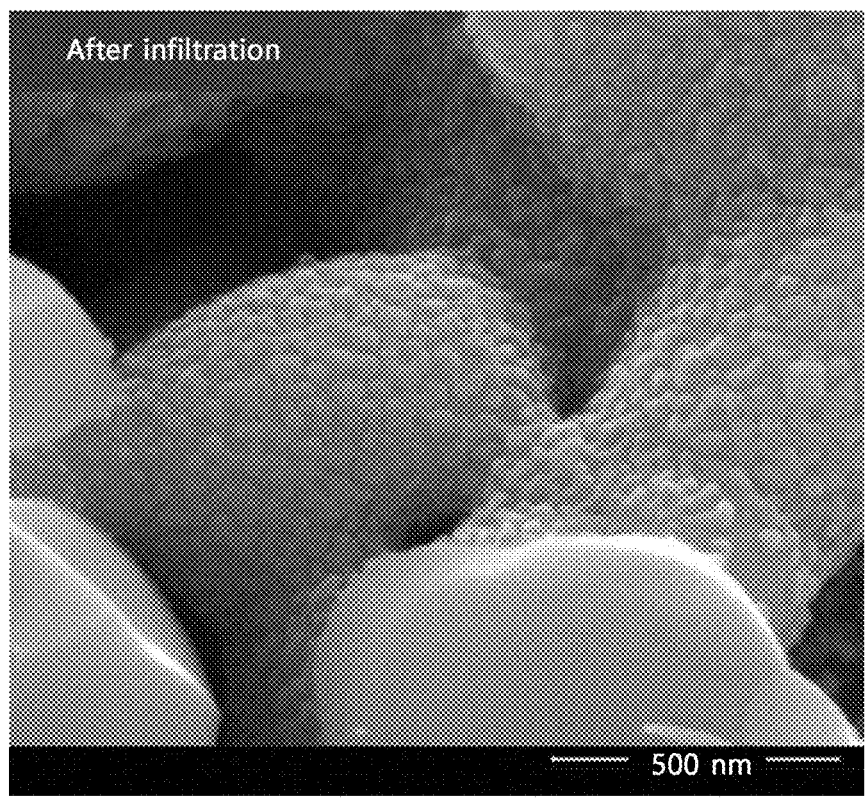

FIGS. 2A and 2B show an SEM image of the surface of the porous oxide anode functional layer according to Example 1, before infiltration (FIG. 2A) and after infiltration (FIG. 2B).

Referring to FIGS. 2A and 2B, it can be seen that nanoparticles having a size of 30-40 nm are formed uniformly on the surface through infiltration.

Figure 3A:
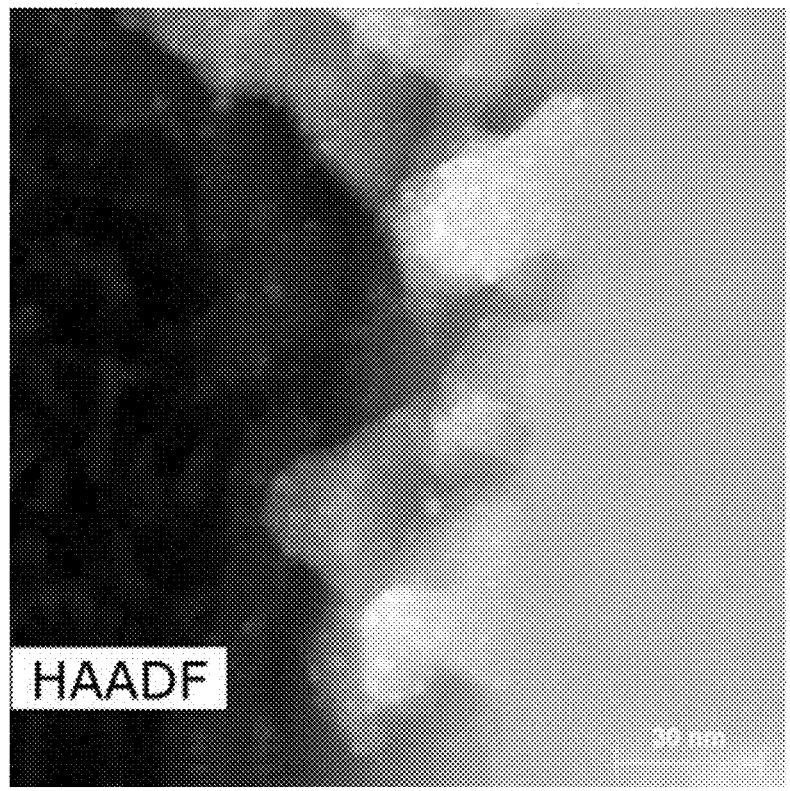
FIGS. 3A to 3C show transmission electron microscopic (TEM) images of the surface of the porous oxide anode functional layer according to Example 1, after heat treatment [Pt (4 mol %)-CeO$_2$ in FIG. 3A. Ce in FIG. 3B and Pt in FIG. 3C].
Figure 3B:
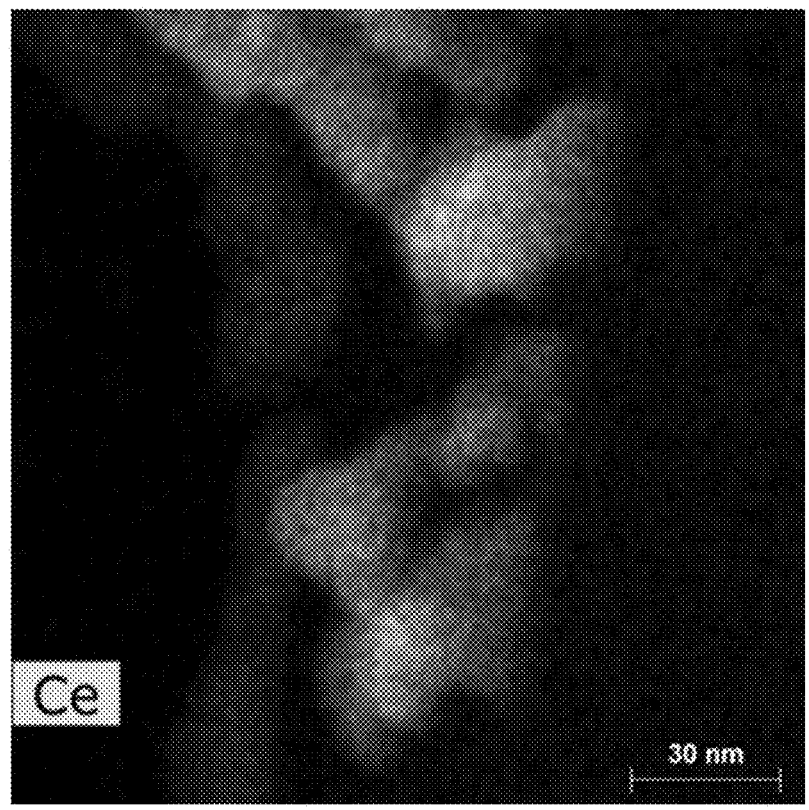
Figure 3C:
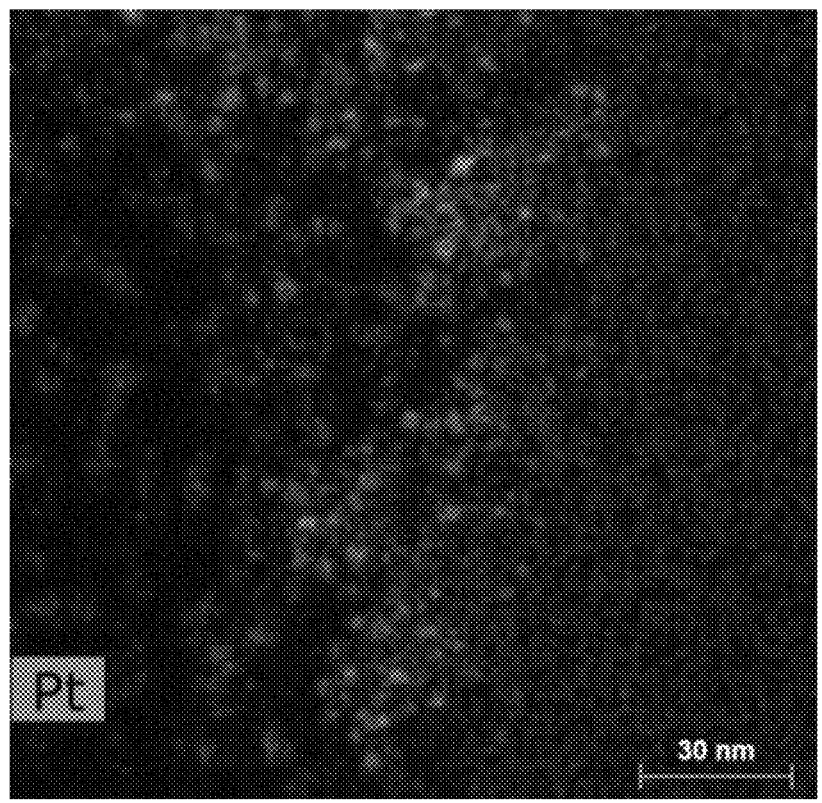

FIGS. 3A to 3C show transmission electron microscopic (TEM) images of the surface of the porous oxide anode functional layer according to Example 1, after heat treatment [Pt (4 mol %)-$CeO_2$ in FIG. 3A, Ce in FIG. 3B and Pt in FIG. 3C].

Referring to FIGS. 3A to 3C, it can be seen that nanoparticles having a size of 30-40 nm are formed on the electrode surface, similarly to the SEM image of FIGS. 2A and 2B. According to the results of elemental analysis, a small amount of Pt is uniformly dispersed on the whole surface of the $CeO_2$ matrix with a significantly fine scale. Pt particles have a size of 1 nm or less. Thus, it is thought that Pt is distributed in the form of a single atom, i.e., in an ionic form.

Figure 4:
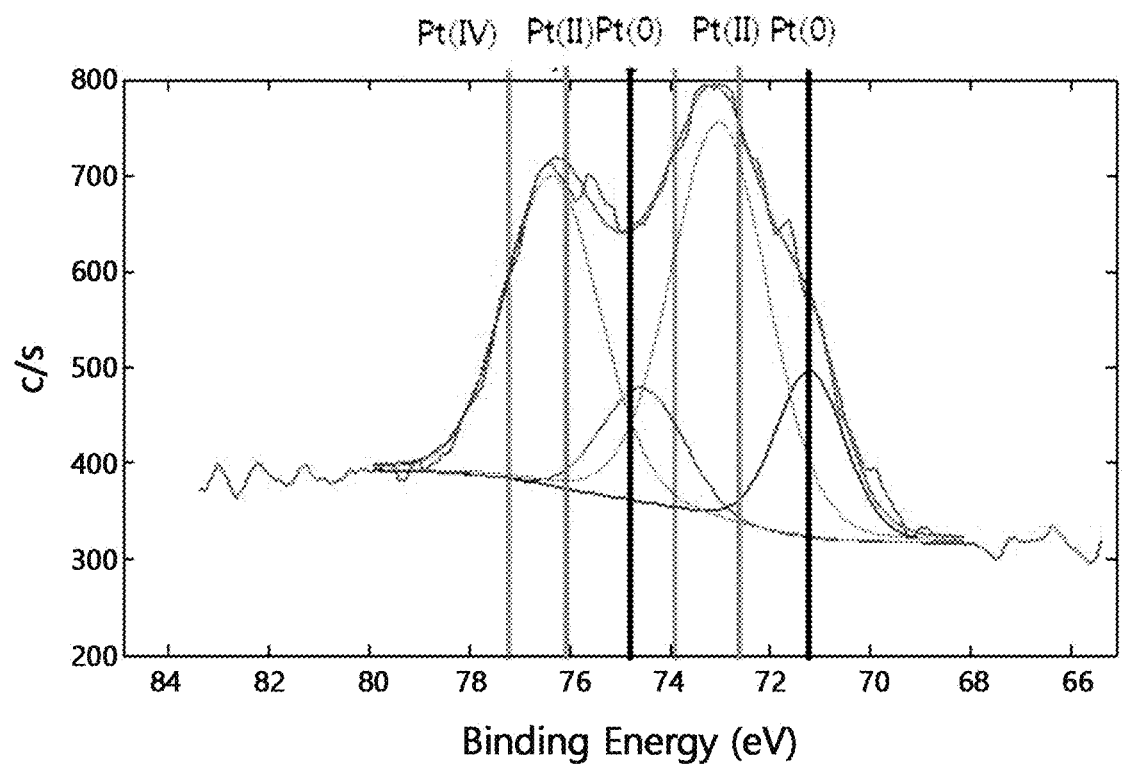
FIG. 4 shows an X-ray photoelectron spectroscopic (XPS) graph of the Pt (4 mol %)-CeO$_2$ nanocatalyst according to Example 1.

FIG. 4 shows an X-ray photoelectron spectroscopic (XPS) graph of the Pt (4 mol %)-$CeO_2$ nanocatalyst according to Example 1.

Referring to FIG. 4, it can be seen that a significant amount of Pt is present as divalent ions instead of a metallic form. It is generally known that when Pt metal nanoparticles having a size of several tens of nanometers or less are exposed to high temperature, they are agglomerated rapidly and the particle size increases. The reason why very fine Pt remains even after heat treatment at a high temperature of 650° C., as shown in FIGS. 3A to 3C, is that most of Pt is doped to $CeO_2$ as single atoms in an ionic form, not a metallic form. When $CeO_2$ is doped uniformly with Pt as mentioned above, it is possible to improve the catalytic activity significantly and to inhibit agglomeration at high temperature through electrostatic repulsion between ions, thereby providing excellent stability.

In addition, it can be seen from XPS analysis that the ratio of the metal particles present in an ionic form is 30-100 wt % based on the total weight of the nanocatalyst.

Figure 5:
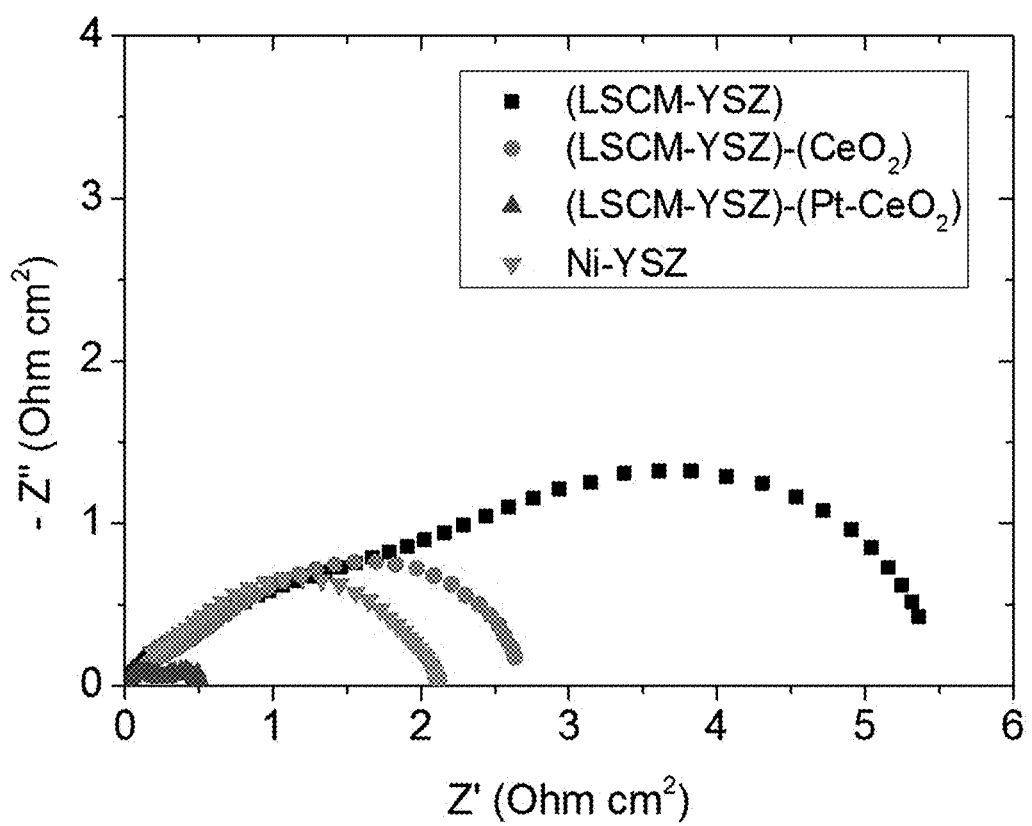
FIG. 5 shows an impedance graph of the porous oxide anode ((LSCM-YSZ)) according to Preparation example 1, the porous oxide anode ((LSCM-YSZ)-(Pt—CeO$_2$)) including the Pt (4 mol %)-CeO$_2$ nanocatalyst according to Example 1, the porous oxide anode ((LSCM-YSZ)-(CeO$_2$)) including the CeO$_2$ nanocatalyst according to Comparative Example 1, and the nickel-based Ni-YSZ anode (Ni-YSZ) according to Comparative Example 2, as determined at 700° C.
Figure 6A:
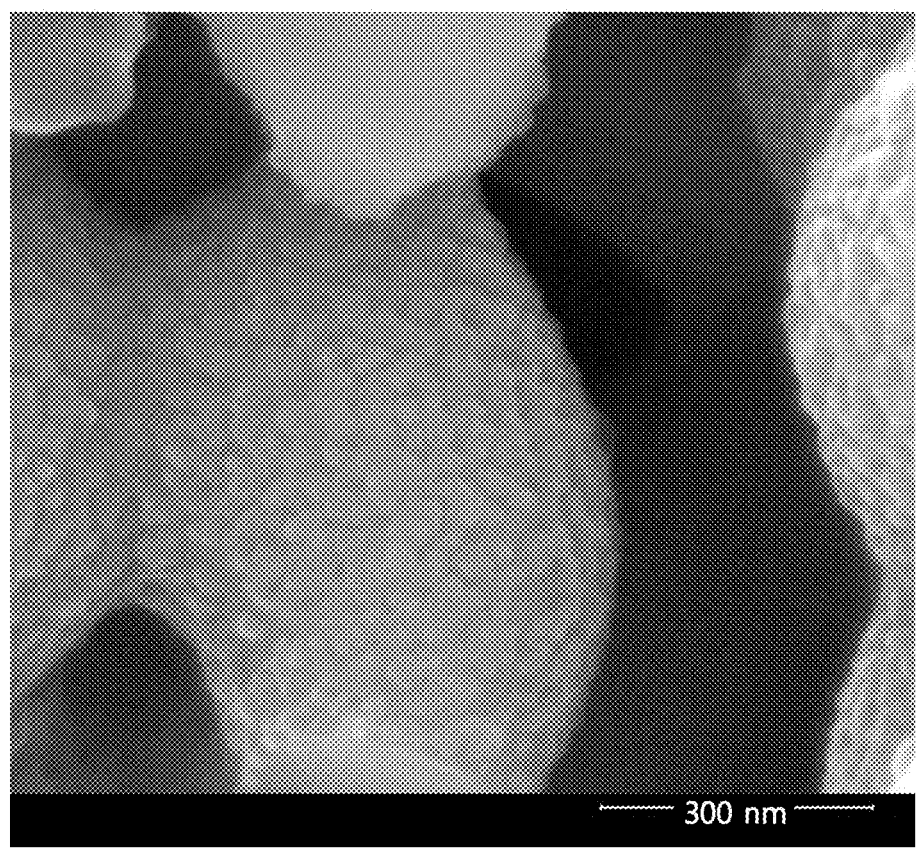
FIG. 6A shows an SEM image of the porous oxide anode including the CeO$_2$ nanocatalyst according to Comparative Example 1.
Figure 6B:
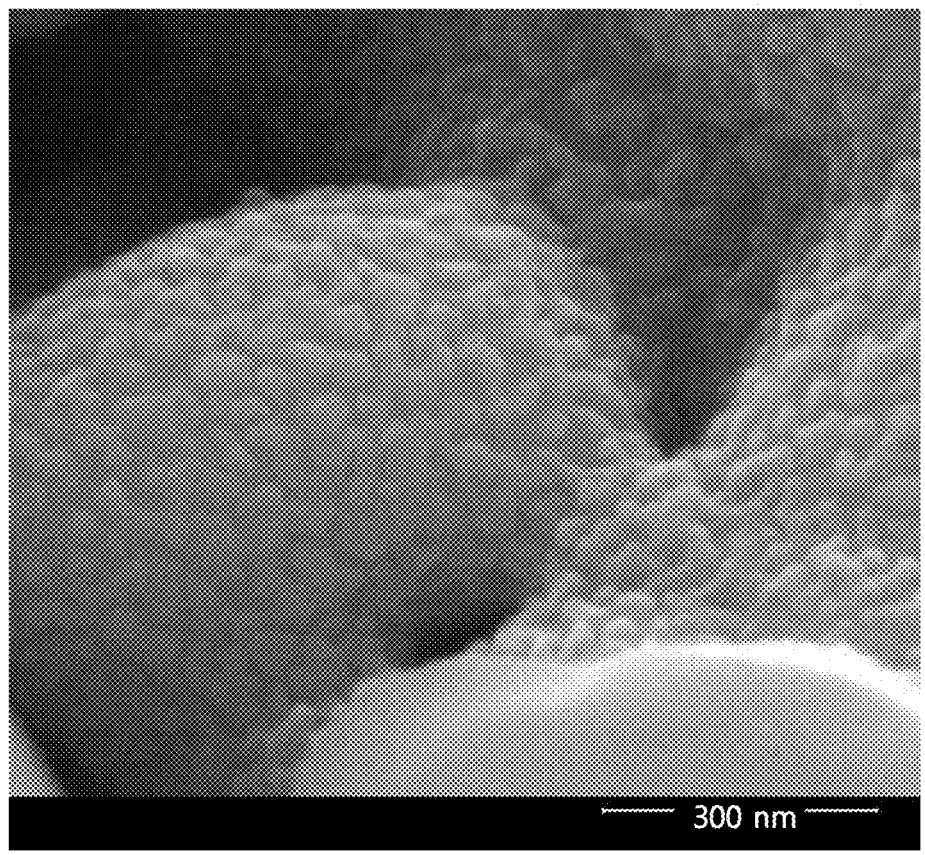
FIG. 6B shows the porous oxide anode including the Pt (4 mol %)-CeO$_2$ nanocatalyst according to Example 1.

FIG. 5 shows an impedance graph of the porous oxide anode ((LSCM-YSZ)) according to Preparation example 1, the porous oxide anode ((LSCM-YSZ)-(Pt—$CeO_2$)) including the Pt (4 mol %)-$CeO_2$ nanocatalyst according to Example 1, the porous oxide anode ((LSCM-YSZ)-($CeO_2$))

including the CeO$_2$ nanocatalyst according to Comparative Example 1, and the nickel-based Ni-YSZ anode (Ni-YSZ) according to Comparative Example 2, as determined at 700° C. In addition, FIG. 6A shows an SEM image of the porous oxide anode including the CeO$_2$ nanocatalyst according to Comparative Example 1, and FIG. 6B shows the porous oxide anode including the Pt (4 mol %)-CeO$_2$ nanocatalyst according to Example 1.

When analyzing the cell, Pt mesh was used as a current collector, hydrogen containing 3-4% of water was supplied as fuel at a flow rate of 200 cc/min, and the impedance was measured. In a Nyquist plot wherein the real number part of the impedance is represented at the x-axis and the imaginary number part of the impedance is represented at the y-axis, the extent of arc represents polarization resistance.

Referring to FIG. 5, while the conventional Ni-YSZ anode shows a polarization resistance of 2.11 Ω·cm$^2$, the pure SCM-YSZ oxide anode to which no nanocatalyst is introduced shows a polarization resistance of 5.36 Ω·cm$^2$, which suggests that replacing Ni with an oxide material causes significant loss of performance. It is widely known that CeO$_2$ has electron conductivity under reductive atmosphere and can function as a catalyst for the oxidation of fuel. When a CeO$_2$ nanocatalyst is infiltrated into the LSCM-YSZ oxide anode, polarization resistance is decreased to 2.63 Ω·cm$^2$, and thus the CeO$_2$ nanocatalyst significantly contributes to improvement of the performance of the oxide electrode. However, in this case, the polarization resistance is still higher as compared to the Ni-YSZ anode by about 25%. On the contrary, when CeO$_2$ doped with a small amount of Pt (4 mol %) is infiltrated, the polarization resistance is decreased to 0.49 Ω·cm$^2$, and thus the resultant anode shows significantly higher performance as compared to Ni-YSZ.

Polarization resistance is affected not only by the material characteristics of a catalyst but also the structural characteristics thereof, such as particle size, specific surface area, distribution, or the like. When the CeO$_2$ nanoparticles of FIG. 6A are compared with the Pt—CeO$_2$ nanoparticles of FIG. 6B, it can be seen that both types of nanoparticles are quite similar. Therefore, since the difference in structural characteristics of nanoparticles depending on the presence of Pt is neglectable, it is thought that such a significant decrease in polarization resistance caused by doping with Pt results from improvement of catalytic activity.

Figure 7A:
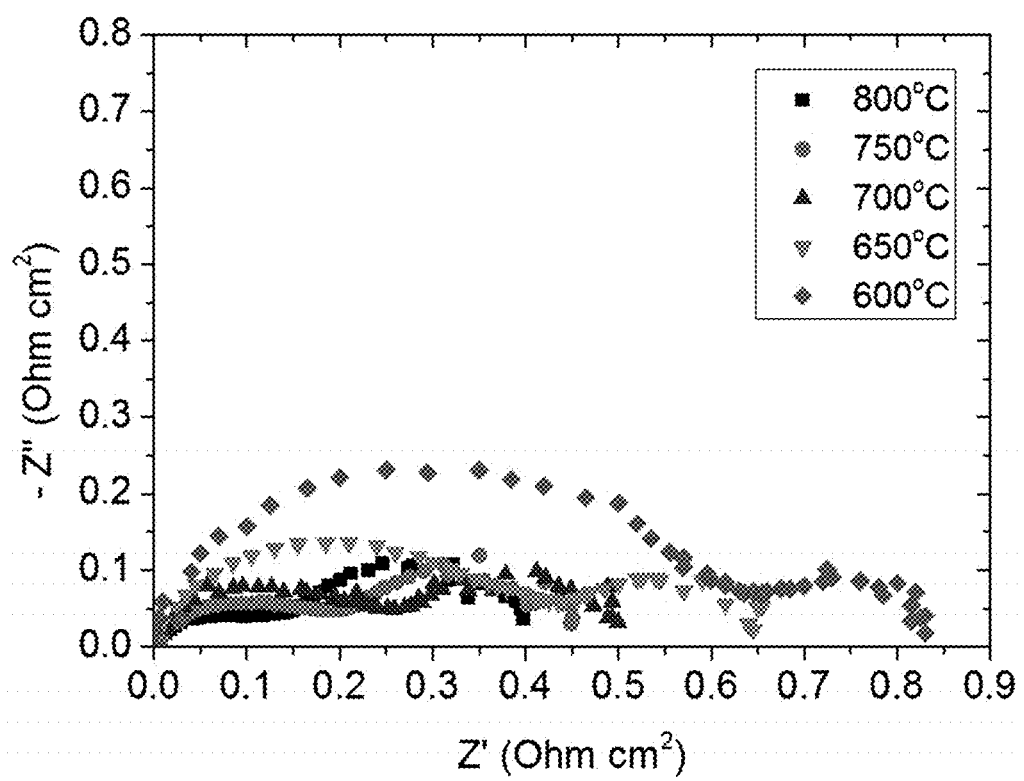
FIG. 7A shows an impedance graph of the porous oxide anode including the Pt (4 mol %)-CeO$_2$ nanocatalyst according to Example 1.
Figure 7B:
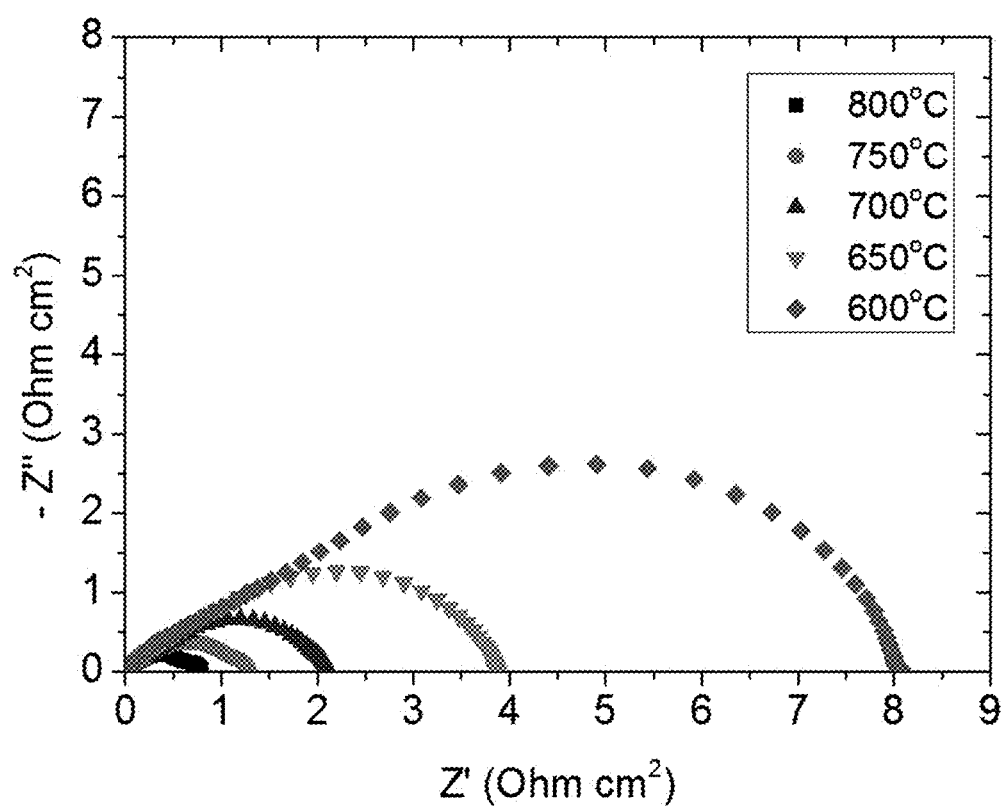
FIG. 7B shows the nickel-based Ni-YSZ anode according to Comparative Example 2, as determined at 600-800° C.
Figure 8A:
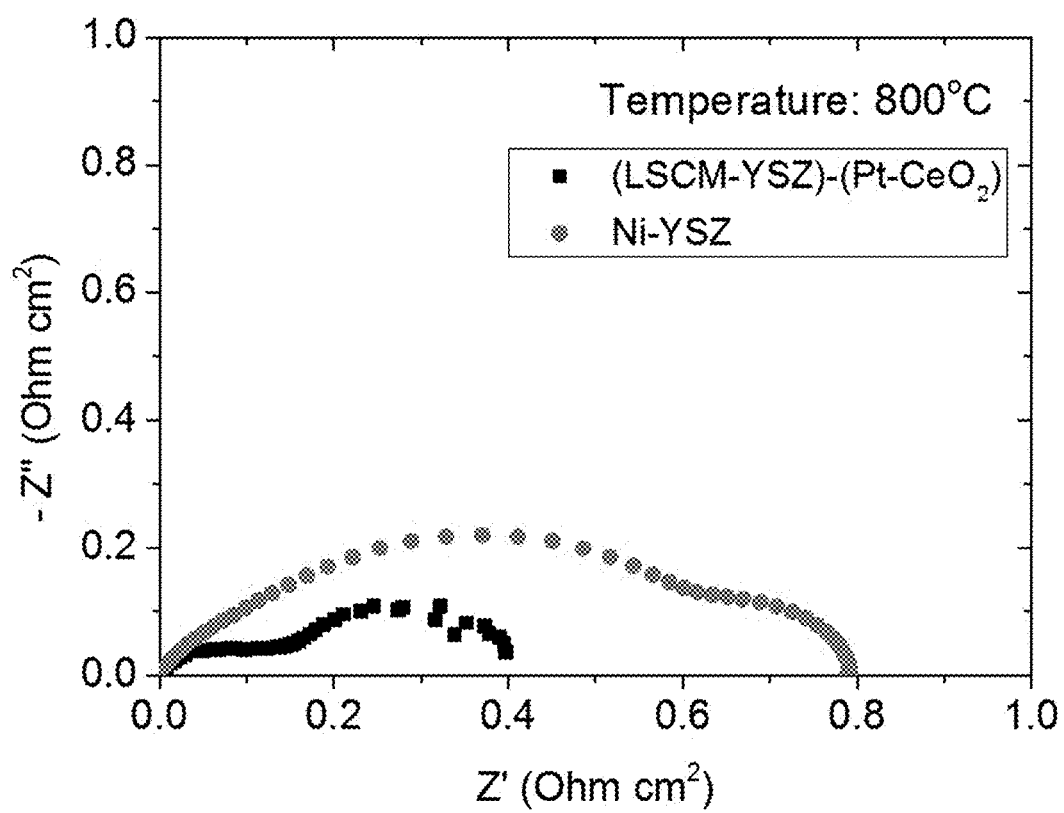
FIGS. 8A to 8C show polarization resistance graphs of the porous oxide anode including the Pt (4 mol %)-CeO$_2$ nanocatalyst according to Example 1, and the nickel-based Ni-YSZ anode according to Comparative Example 2, depending on temperature
Figure 8B:
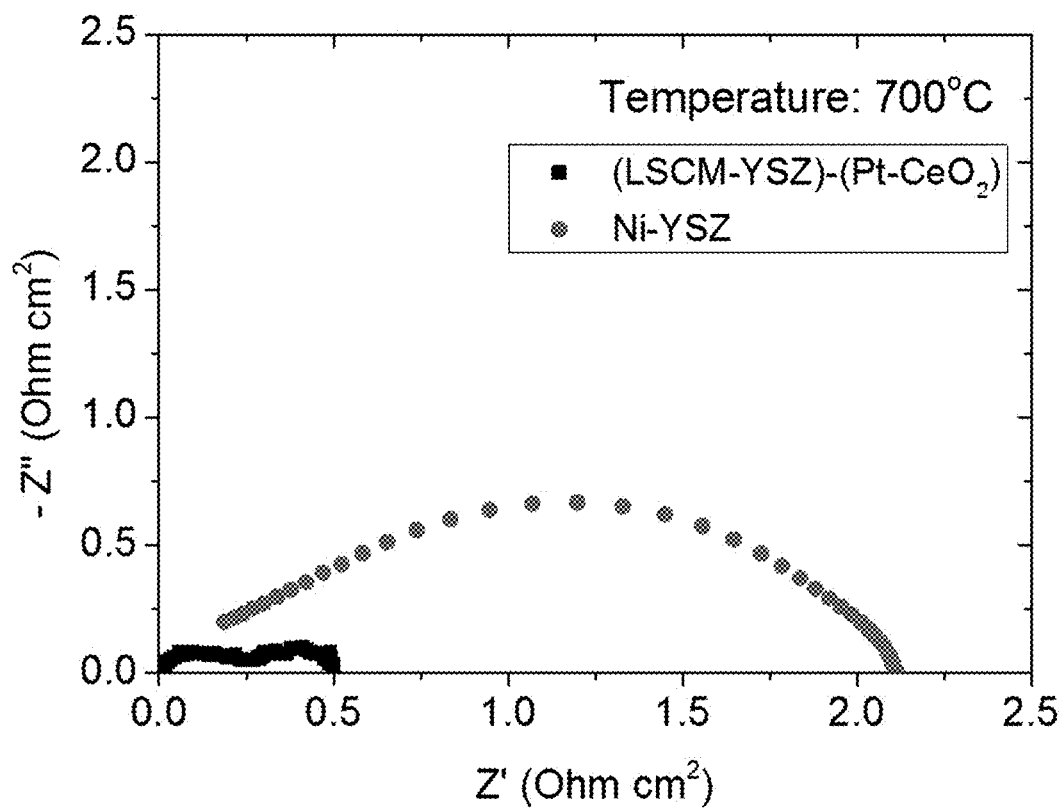
Figure 8C:
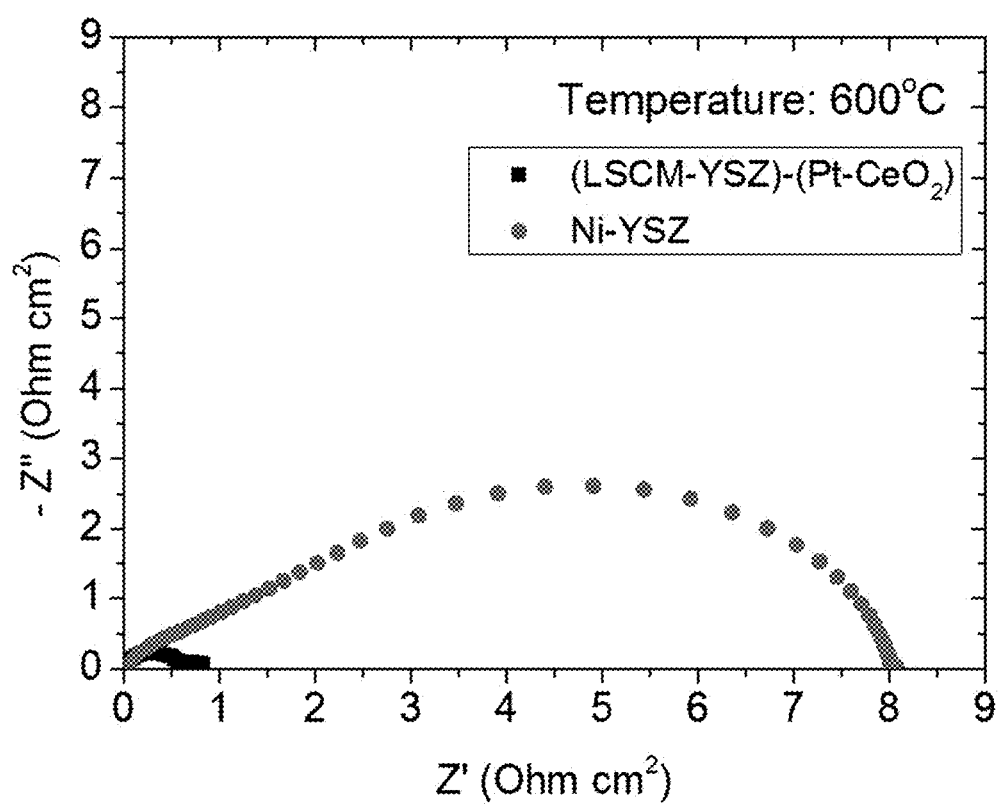

FIG. 7A shows an impedance graph of the porous oxide anode including the Pt (4 mol %)-CeO$_2$ nanocatalyst according to Example 1, and FIG. 7B shows the nickel-based Ni-YSZ anode according to Comparative Example 2, as determined at 600-800° C. In addition, FIGS. 8A to 8C show polarization resistance graphs of the porous oxide anode including the Pt (4 mol %)-CeO$_2$ nanocatalyst according to Example 1, and the nickel-based Ni-YSZ anode according to Comparative Example 2, depending on temperature [FIG. 8A: 800° C., FIG. 8B: 700° C. and FIG. 8C: 600° C.]. Further, FIG. 9 shows a graph illustrating the dependence of polarization resistance on temperature for the porous oxide anode including the Pt (4 mol %)-CeO$_2$ nanocatalyst according to Example 1, and the nickel-based Ni-YSZ anode according to Comparative Example 2.

Referring to FIGS. 7A and 7B, it can be seen that the LSCM-YSZ oxide anode including the Pt (4 mol %)-CeO$_2$ nanoparticles show higher characteristics as compared to the Ni-YSZ anode over the whole temperature range of 600-800° C.

In addition, as can be seen from FIGS. 8A to 8C illustrating the comparison between two electrodes as a function of temperature, the difference in performance is increased as the operation temperature is decreased.

Figure 9:
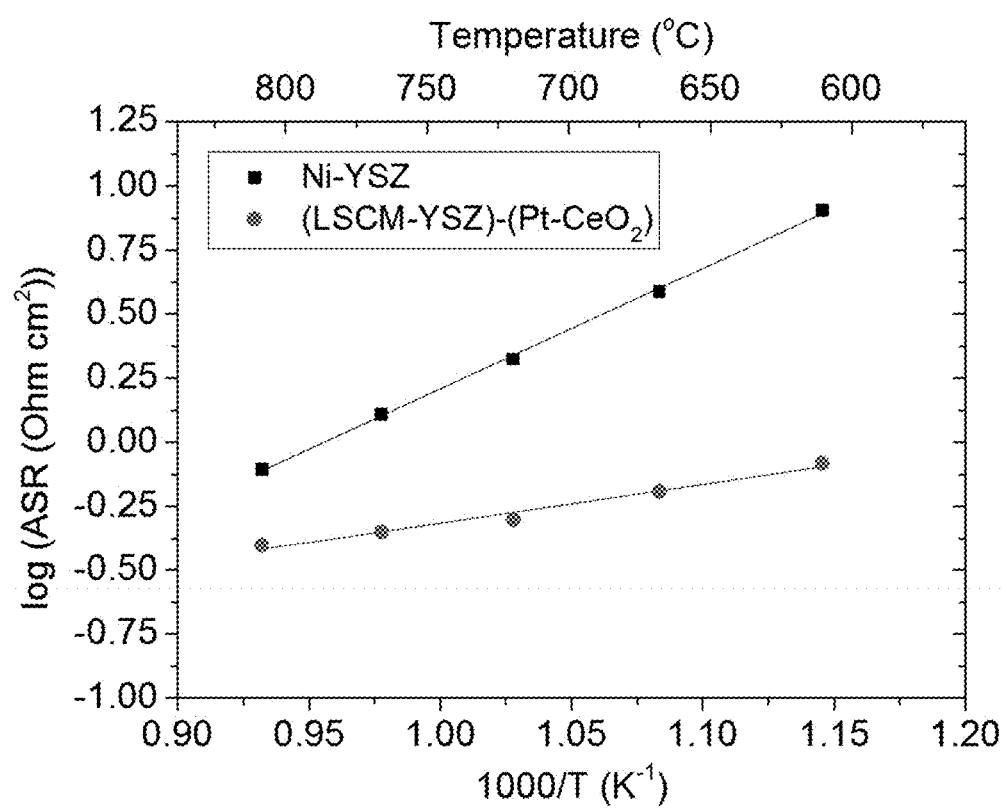
FIG. 9 shows a graph illustrating the dependence of polarization resistance on temperature for the porous oxide anode including the Pt (4 mol %)-CeO$_2$ nanocatalyst according to Example 1, and the nickel-based Ni-YSZ anode according to Comparative Example 2.

Referring to FIG. 9 illustrating the dependence of polarization resistance on temperature, it can be seen that the LSCM-YSZ oxide anode including the Pt (4 mol %)-CeO$_2$ nanoparticles shows a significantly lower activation energy as compared to the Ni-YSZ anode. This can be explained by the characteristics of Pt as described above with reference to TEM and XPS. In other words, it is known that when CeO$_2$ is doped with ionic Pt, the catalytic characteristics are improved significantly as compared to metallic Pt. Since Pt having excellent characteristics is dispersed over the whole CeO$_2$ matrix with a very fine scale, the number of reactive sites is increased significantly. In addition, when CeO$_2$ is doped with Pt$^{2+}$ ions, the concentration of oxygen vacancies is increased locally around the ions, and thus supply of oxygen ions required for the oxidation of fuel is stimulated. By virtue of such complex effects, the performance of the electrode, particularly the performance at intermediate or low temperature is improved significantly as compared to the conventional Ni-YSZ anode in which hydrogen is adsorbed to the Ni surface and transferred over a relatively long distance so that charge transfer occurs at the three-phase interface. Therefore, infiltration of Pt (4 mol %)-CeO$_2$ nanoparticles to the oxide anode provides excellent performance at low temperature as compared to the conventional Ni-based anode. As a result, it is thought that the anode including Pt (4 mol %)-CeO$_2$ nanoparticles infiltrated thereto can contribute to a decrease in operation temperature of SOFC to an intermediate or low temperature range.

Figure 10:
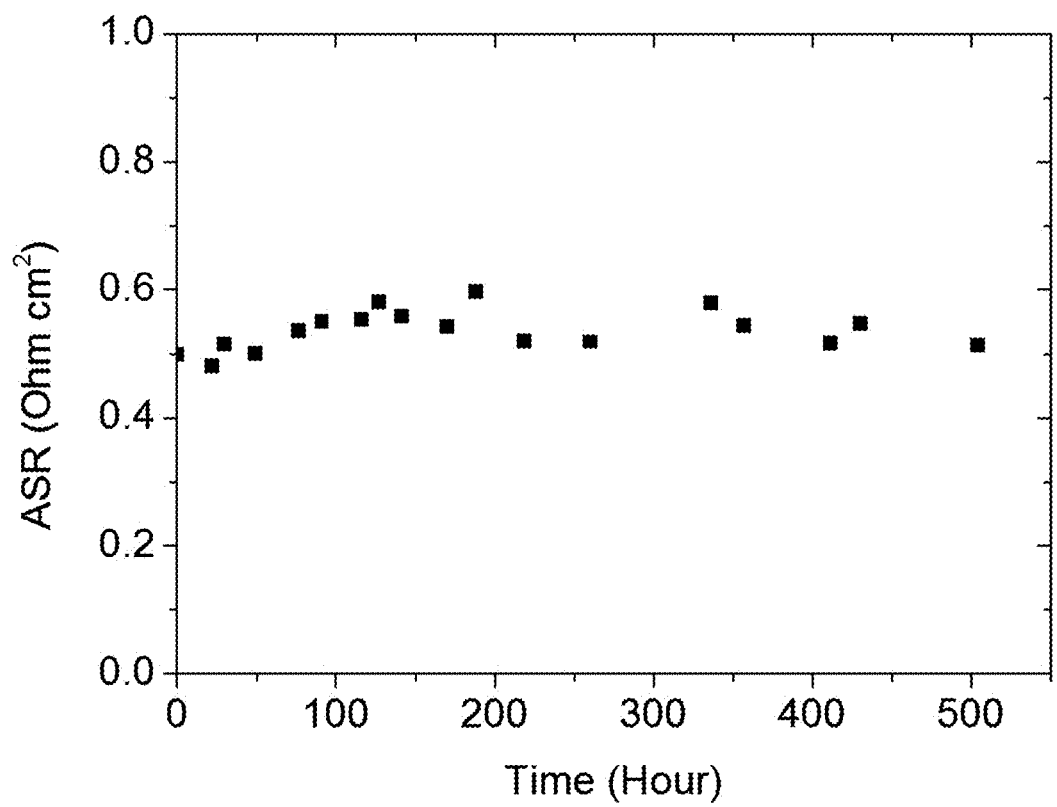
FIG. 10 shows a graph illustrating variations in polarization resistance as a function of time at 750° C. for the porous oxide anode including the Pt (4 mol %)-CeO$_2$ nanocatalyst according to Example 1.

FIG. 10 shows a graph illustrating variations in polarization resistance as a function of time at 750° C. for the porous oxide anode including the Pt (4 mol %)-CeO$_2$ nanocatalyst according to Example 1.

The most serious problem in applying a nanomaterial to a solid oxide fuel cell is degradation of performance caused by a structural change at high temperature.

Referring to FIG. 10, it can be seen that the ratio of degradation of performance after 500 hours is 2%, which suggests high stability applicable to an actual cell. In the case of conventional nanoparticles, noble metal nanoparticles, such as Pt, highly tend to agglomerate at high temperature. Thus, when such noble metal nanoparticles are used as a catalyst, they undergo a rapid decrease in specific surface area as soon as they are exposed to high temperature, resulting in degradation of performance. As shown in FIG. 10, the anode shows little degradation of performance. This demonstrates that CeO$_2$ nanoparticles are thermally stable and Pt is doped to the stable matrix in a non-metallic form, i.e., ionic form. Therefore, the CeO$_2$ nanocatalyst doped with Pt according to the present disclosure has excellent catalytic activity and excellent thermal stability at the same time.

As can be seen from the foregoing, according to the present disclosure, it is possible to form a nanocatalyst for an anode of a solid oxide fuel cell through an infiltration process in situ in the internal pores of a porous electrode, and to apply the nanocatalyst to a solid oxide fuel cell having significantly higher electrochemical characteristics as compared to the solid oxide fuel cells including the conventional nickel-based anode and oxide anode, and particularly showing excellent characteristics at an intermediate or low temperature of 600° C. or less.

What is claimed is:
1. A nanocatalyst for an anode of a solid oxide fuel cell formed in internal pores of a porous electrode, the nanocatalyst comprising:

a ceramic that is doped with a plurality of metal particles which are dispersed on a surface of the ceramic, which are present in a mixed form of ions with metal, and which comprise a metal selected from the group consisting of Au, Ag, Pd, Ir, Rh, Ru, Os, and combinations thereof, and that is fluorite represented by Chemical Formula 1 below:

$$A_{1-a-b}Ce_aZr_bO_{2-\delta},$$

where A is an element selected from the group consisting of Y, Sc, Gd, Sm, La, Nb, Nd, Pr, Yb, Er, Tb and Ca, and each of a, b and δ is a real number satisfying $0 \leq a \leq 1$, $0 \leq b \leq 1$ and $0 \leq \delta \leq 1$, wherein the ions in the mixed form or ions with metal are an ionic species present in a ratio of 30 wt % or more based on total weight of metallic components as determined by X-ray photoelectron spectroscopy (XPS) analysis.

2. The nanocatalyst according to claim 1, wherein the metal is present in an amount of 2-6 mol % based on the nanocatalyst.

3. The nanocatalyst according to claim 1, wherein the nanocatalyst has a particle size of 30-40 nm, and the plurality of metal particles has a particle size of 0.1-1 nm.

4. A nanocatalyst for an anode of a solid oxide fuel cell formed in internal pores of a porous electrode, the nanocatalyst comprising:

a ceramic that is doped with a plurality of metal particles which are dispersed on the ceramic surface and comprise a metal selected from the group consisting of Au, Ag, Pd, Ir, Rh, Ru, Os, and combinations thereof and that is fluorite represented by Chemical Formula 1 below:

$$A_{1-a-b}Ce_aZr_bO_{2-\delta}, \quad \text{Chemical Formula 1}$$

where A is an element selected from the group consisting of Y, Sc, Gd, Sm, La, Nb, Nd, Pr, Yb, Er, Tb and Ca, and each of a, b and δ is a real number satisfying $0 \leq a \leq 1$, $0 \leq b \leq 1$ and $0 \leq \delta \leq 1$, wherein:

the nanocatalyst includes the metal in an amount of 2-6 mol %;

the nanocatalyst has a particle size of 30-40 nm;

the plurality of metal particles has a particle size of 0.1-1 nm;

the metal particles are present in a mixed form of ions with metal; and the ions in the mixed form of ions with metal are an ionic species present in a ratio of 30 wt % or more based on total weight of metallic components as determined by X-ray photoelectron spectroscopy (XPS) analysis.

5. The nanocatalyst according to claim 3, wherein the metal is present in an amount of 2-6 mol % based on the nanocatalyst.

* * * * *